United States Patent
Liu et al.

(10) Patent No.: US 10,776,131 B2
(45) Date of Patent: Sep. 15, 2020

(54) METHOD AND APPARATUS FOR UEFI FIRMWARE BOOT JOURNAL RECORDING

(71) Applicant: DELL PRODUCTS, LP, Round Rock, TX (US)

(72) Inventors: Wei Liu, Austin, TX (US); Po-Yu (Smith) Cheng, Tainan (TW)

(73) Assignee: Dell Products, L.P., Round Rock, TX (US)

( * ) Notice: Subject to any disclaimer, the term of this patent is extended or adjusted under 35 U.S.C. 154(b) by 162 days.

(21) Appl. No.: 16/117,286

(22) Filed: Aug. 30, 2018

(65) Prior Publication Data

US 2020/0073676 A1    Mar. 5, 2020

(51) Int. Cl.
  *G06F 9/24*     (2006.01)
  *G06F 15/177*   (2006.01)
  *G06F 9/4401*   (2018.01)
  *G06F 3/06*     (2006.01)

(52) U.S. Cl.
  CPC .......... *G06F 9/4411* (2013.01); *G06F 3/0604* (2013.01); *G06F 3/0632* (2013.01); *G06F 3/0656* (2013.01); *G06F 3/0679* (2013.01)

(58) Field of Classification Search
  None
  See application file for complete search history.

(56) References Cited

U.S. PATENT DOCUMENTS

| | | | |
|---|---|---|---|
| 8,341,387 B2 * | 12/2012 | Hentosh | G06F 9/4401 713/1 |
| 8,918,652 B2 | 12/2014 | Pant et al. | |
| 9,047,452 B2 | 6/2015 | Dailey et al. | |
| 9,507,604 B2 * | 11/2016 | Huang | G06F 9/4401 |
| 10,032,028 B2 | 7/2018 | Chaiken et al. | |
| 10,133,654 B1 * | 11/2018 | Deiderich, III | G06F 11/3636 |
| 2002/0004905 A1 | 1/2002 | Davis et al. | |
| 2009/0249120 A1 * | 10/2009 | Yao | G06F 11/1417 714/15 |
| 2016/0147996 A1 | 5/2016 | Martinez | |

* cited by examiner

*Primary Examiner* — Nitin C Patel
(74) *Attorney, Agent, or Firm* — Larson, Newman, LLP

(57) ABSTRACT

An information handling system includes a flash memory and a processor. The processor executes boot instructions including a boot log agent configured to collect initialization phase messages. The flash memory device also includes a circular buffer configured to store the collected initialization phase messages.

17 Claims, 4 Drawing Sheets

```
$ efivar --p --n e9ea9752-5114-409d-ab20-7bfadea9988a05-ECLOG
GUID: e9ea9752-5114-409d-ab20-7bfadea9988a05
Name: "ECLOG"
Attributes:
    Boot Service Access
    Runtime Service Access
Value:
00000000   4d 53 4d 4c c4 44 ae   1f 00 00 00 00 04 01 00 00   |ECL.D............|
00000010   5e 4e 63 5d 20 4d 51   6e 61 67 64 65 6e 74 00 01   |[EC] Embedded...|
00000020   20 53 86 43 20 63 62   62 02 52 08 01 06 62 12 13   | Controller.......|
00000030   20 60 24 65 92 12 46   78 02 89 09 12 01 00 42 03   | Power on...[EC]..|
00000040   20 61 22 18 14 45 56   20 02 32 23 25 09 09 01 95   | OEMEC_001_1..|
00000050   20 42 34 13 54 69 12   50 30 30 30 30 31 59 39 31   |B0/B1 BtG Enabl |
00000060   20 34 12 34 66 69 12   74 12 5f 23 13 59 89 78 7e   |ed (Build date: Mo|
00000070   29 01 12 34 78 13 61   82 12 55 12 37 12 09 81 43   |n 4/01/2018 18:02|
00000080   13 34 56 59 13 34 82   12 56 43 12 35 29 12 12 12   |:90:22:16]..(EC)..|
00000090   3a 34 12 69 13 98 67   81 23 65 12 78 12 00 30 20   |Configuration Mem|
000000a0   6d 61 3e 13 09 09 14   78 13 54 12 10 30 30 13 14   |ory...done...(EC)..|
000000b0   61 64 67 12 78 78 68   13 58 12 90 67 12 34 12 29   |Verifying BIOS Bo |
000000c0   51 53 89 12 39 38 38   12 12 59 12 00 12 12 60 10   |ot Block....[EC]... S|
000000d0   14 52 64 12 38 12 45   23 14 34 53 56 41 53 53 67   |tart Loading BIOS |
000000e0   12 65 13 90 09 12 39   13 39 13 59 38 23 54 52 56   |drivers...ECL D.....|
000000f0   45 13 39 39 12 78 78   12 56 77 12 78 39 39 12 13   |..... P ..[EC].... Ent|
00000100   65 13 09 34 56 39 12   12 34 56 23 78 49 12 39 39   |ering BDS...[EC]..|
00000110   20 39 78 34 56 77 31      45 67 56 11 23 46 56 38 12   | Initializing SATA,..|
```

*FIG. 5*

METHOD AND APPARATUS FOR UEFI FIRMWARE BOOT JOURNAL RECORDING

FIELD OF THE DISCLOSURE

This disclosure generally relates to information handling systems, and more particularly relates to unified extensible firmware interface (UEFI) firmware boot journal recording.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A UEFI can provide an interface between the hardware and firmware of the information handling system and an operating environment of the information handling system.

SUMMARY

An information handling system includes a flash memory and a processor. The processor executes boot instructions that may include a boot log agent configured to collect initialization phase messages. The flash memory device also includes a circular buffer configured to store the collected initialization phase messages.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 shows an example of initialization messages as retrieved by a runtime operating system (OS) of an information handling system according to a specific embodiment of the present disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

Figure 1:
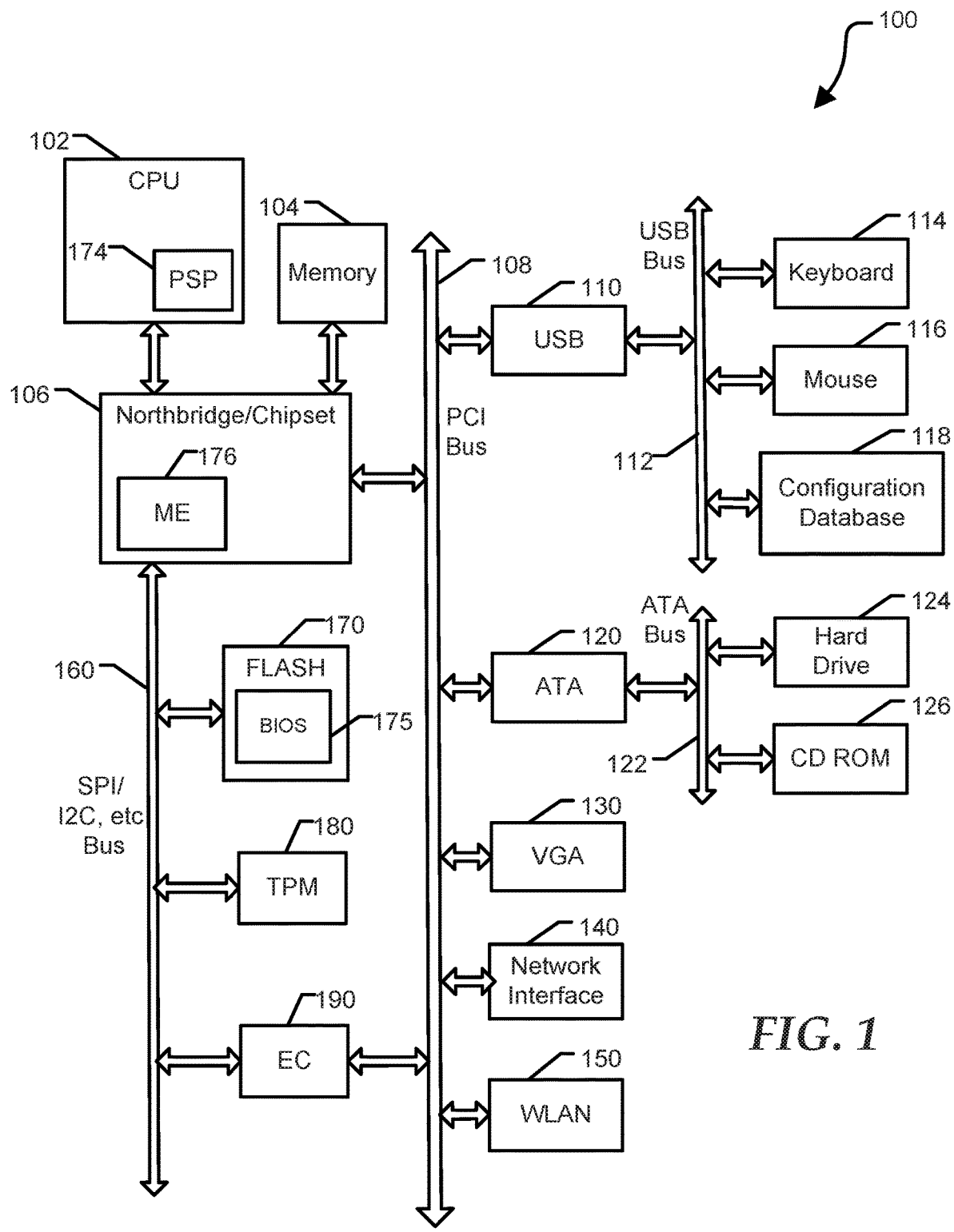
FIG. 1 is a block diagram of an information handling system according to an embodiment of the present disclosure.

FIG. 1 illustrates an information handling system 100 including a central processing unit (CPU) 102, a system memory 104, a chipset 106, a peripheral component interconnect (PCI) bus 108, a universal serial bus (USB) controller 110, a USB 112, a keyboard device controller 114, and a mouse device controller 116. The information handling system also includes a configuration database 118, an advanced technology attachment (ATA) bus controller 120, an ATA bus 122, a hard drive device controller 124, a compact disk read-only memory (CD ROM) device controller 126, a video graphics array (VGA) device controller 130, a network interface controller (NIC) 140, a wireless local area network (WLAN) controller 150, a serial peripheral interface (SPI) bus 160, a flash memory device 170 for storing a basic input/output system (BIOS) 175, a trusted platform module (TPM) 180, and an embedded controller (EC) 190.

For purposes of this disclosure, the EC is a construct to represent an embedded device such as a System-on-a-Chip (SoC) or other control logic hardware. Debugging is a challenge with embedded devices such as the EC. For example, there may be constraints on persistent storage where generating core dump files and running debuggers are limited due to the embedded environment. Power-On Self Test (POST) messages, also referred to as initialization messages, may disclose information about the embedded devices such as a firmware update, BIOS update, and a hard disk drive's (HDD's) firmware update, etc. The POST messages may also be relied on to validate a device's presence and health, such as determining whether a low power double data rate (LPDDR) dual in-line memory module (DIMM) is of the right size, or whether a media access control (MAC) address is valid. Because embedded devices have no video display, the only way to stream the POST messages is through a serial universal asynchronous receiver-transmitter (UART). In addition, some embedded devices do not have a connected serial cable connected or access to a serial communication program such a HyperTerminal to capture the POST messages. Moreover, even if the embedded device has a serial cable, the POST or initialization process happens in a few seconds, so that by the time the serial cable is connected to stream messages, the POST messages are gone.

Currently, there is no system or method to capture POST messages of an embedded device. Thus, there is no way of determining information such as the health, status and/or activities of these embedded devices during the initialization phases. For example, if an embedded device fails to initialize properly, then one cannot use a tool to debug the issue. Thus, there is a need for improved systems and methods for monitoring and/or debugging issues of embedded devices.

The EC 190 may be programmed to perform specific functionality. For example, the EC 190 may be programmed to act as a chassis management controller (CMC) and the like. A CMC is an embedded system management hardware and/or software solution that is used to monitor, manage, and maintain servers, storage, and networking. For example, the CMC may monitor the temperature, voltage, and processor input/output (I/O) statistics, maintain software updates, and/or enable alerts to events.

In an embodiment, the information handling system 100 can further include a platform security processor (PSP) 174 and/or a management engine (ME) 176. In particular, an x86 processor provided by AMD can include PSP 174, while the ME 176 is typically associated with systems based on x86 processors and can be included at the chipset 106.

Information handling systems typically utilize a collection of firmware that is configured to initialize individual subsystems and to ultimately launch an OS. Firmware included at an information handling system is often referred to as BIOS. Today, much of the industry has incorporated the UEFI specification.

Common to most firmware and system initialization architectures is the concept of the root of trust. At a general level, the root of trust relates to software processes and/or hardware devices that ensure that firmware and other software for the operation of an information handling system is operating as expected. The important aspect for a root of trust is to be sure that the initial code is what the manufacturer intended before the code is executed. When the information handling system starts, the root of trust can execute self-tests to validate the first piece of code in the chain of trust. At the present time, AMD utilizes a PSP to provide an initial root of trust, while Intel provides this function using the ME. The PSP and the ME are both configured to validate initial firmware at a BIOS image, herein referred to as an initial boot block. Each of these architectures poses unique security considerations. Furthermore, original equipment manufacturers (OEMs) may have difficulty integrating proprietary functionality within the confines of these divergent initialization architectures.

The information handling system 100 can include additional components and additional busses, not shown for clarity. For example, the information handling system 100 can include multiple processor cores, audio devices, and the like. While a particular arrangement of bus technologies and interconnections is illustrated for the purpose of example, one of skill will appreciate that the techniques disclosed herein are applicable to other system architectures. The information handling system 100 can include one or more components such as multiple CPUs and redundant bus controllers. These components can be integrated together. For example, portions of the chipset 106 can be integrated within the CPU 102. In an embodiment, the chipset 106 can include a platform controller hub (PCH). The information handling system 100 can include additional buses and bus protocols, for example, Inter-Integrated Circuit (I²C) and the like. Additional components of the information handling system 100 can include one or more storage devices that can store machine-executable code, one or more communications ports for communicating with external devices, and various I/O devices, such as a keyboard, a mouse, and a video display.

PSP 174 and ME 176 are processors that can operate independently of core processors at CPU 102, and that can execute firmware prior to the execution of the BIOS by a primary CPU core processor. PSP 174 typically is a microcontroller that includes dedicated read-only memory (ROM) and static random access memory (SRAM). PSP 174 is an isolated processor that runs independently from the main CPU processor cores. PSP 174 has access to firmware stored at the flash memory device 170. During the earliest stages of initialization of the information handling system 100, PSP 174 is configured to authenticate the first block of BIOS 175 stored at the flash memory device 170 before releasing the x86 processor from reset. Accordingly, PSP 174 provides a hardware root of trust for the information handling system 100. ME 176 provides similar functionality in Intel-based systems.

For purposes of this disclosure, the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, the information handling system 100 can include processing resources for executing machine-executable code, such as CPU 102, a programmable logic array (PLA), an embedded device such as an SoC, or other control logic hardware. The information handling system 100 can also include one or more computer-readable medium for storing machine-executable code, such as software or data.

BIOS 175 can be referred to as a firmware image, and the term BIOS is herein used interchangeably with the term firmware image, or simply firmware. BIOS 175 includes instructions executable by CPU 102 and PSP 174 to initialize and test the hardware components of the information handling system 100 and to load a boot loader or an OS from a mass storage device. BIOS 175 additionally provides an abstraction layer for the hardware, which is a consistent way for application programs and OSs to interact with the keyboard, display, and other input/output devices. When power is first applied to the information handling system 100, the system begins a sequence of initialization procedures. During the initialization sequence, also referred to as a boot sequence, components of the information handling system 100 are configured and enabled for operation, and device drivers can be installed. Device drivers provide an interface through which other components of the information handling system 100 can communicate with a corresponding device. BIOS 175 can include instructions to capture information during the initialization sequence and testing of the hardware components of the information handling system 100. Such instructions may be referred to as a boot journal agent.

In an embodiment, the BIOS 175 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an OEM can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
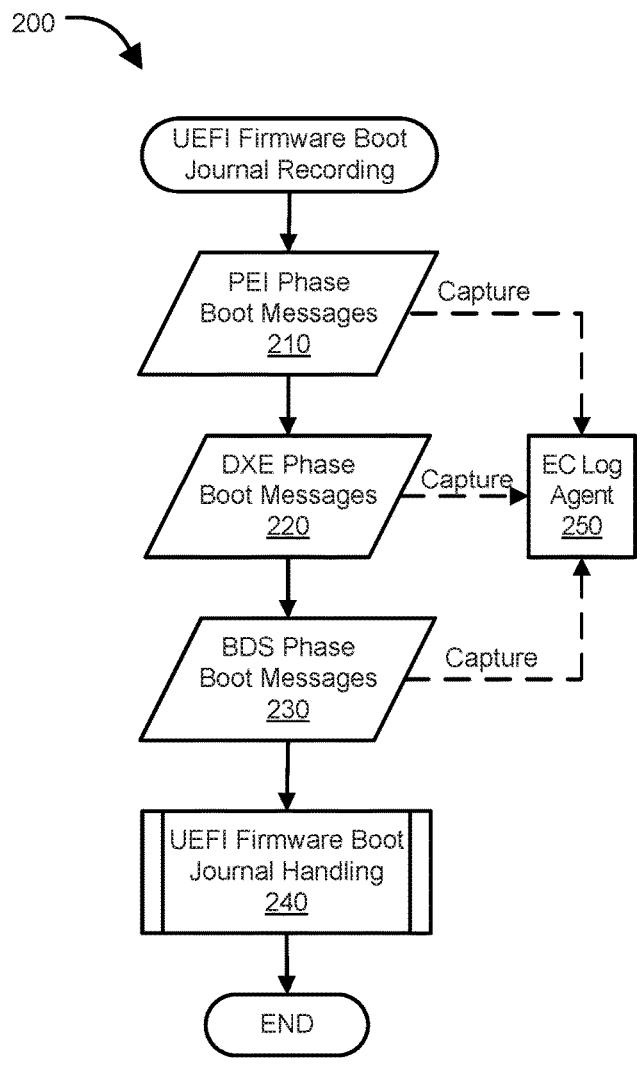
FIG. 2 is a flowchart that shows a UEFI firmware boot journal recording of an information handling system according to a specific embodiment of the present disclosure.

FIG. 2 shows a UEFI firmware boot journal recording 200 of the information handling system 100. The UEFI firmware boot journal recording 200 includes capture and storage of messages during the POST or boot process. Specific operations that occur during these earliest stages of the boot process can vary from one equipment manufacturer to another. Typically the boot process can be divided into a sequence of stages or phases including a pre-EFI initialization (PEI) phase, a driver execution environment (DXE), and a boot device selection (BDS) phase. The PEI phase begins early in the boot process. The PEI phase includes CPU initialization, chipset initialization, and board resource initialization so that the DXE phase can be loaded and executed. The DXE phase performs device-specific initializations for the information handling system. In particular, the EFI driver dispatcher is executed during the DXE phase. The EFI driver dispatcher operates to load device, bus and service drivers. The BDS phase includes execution of a boot manager which identifies a boot target and passes execution to a transient system load phase (TSL). TSL can launch an OS boot loader, which loads the OS and passes execution to the OS runtime environment.

In an embodiment, an EC log agent 250 captures or collects messages during the different stages of the boot process. For purposes of this embodiment, the EC log agent 250 is a boot journal agent, which captures all messages during the boot process. For example, the EC log agent 250 captures 210 PEI phase boot messages, captures 220 DXE phase messages and captures 230 BDS phase messages. PEI phase boot messages are initialization phase messages outputted during the PEI initialization phase. DXE phase messages are initialization phase messages outputted during the DXE phase. BDS phase messages are initialization phase messages outputted during the BDS phase. At each stage of the boot process, the EC log agent 250 may put the captured messages in a cache.

The EC log agent then appends the next captured messages. For example, the EC log agent 250 captures 210 the PEI phase boot messages and puts the messages in a cache. When the boot process transitions to the DXE phase, the EC log agent 250 captures 220 the DXE phase messages and appends captured messages to the messages in the cache. When the boot process transitions to the BDS phase, the EC log agent 250 captures the BDS phase massages and also appends the captured messages to the messages in the cache. Prior to loading the OS and passing execution to the OS runtime environment, the captured phase messages are handled in the UEFI firmware boot journal handling block 240. Details of the UEFI firmware boot journal handling block 240 are illustrated in a method 300 of FIG. 3. At each stage of the boot process, if a failure is encountered, the EC log agent 250 may be configured to determine whether the UEFI firmware boot journal recording 200 transitions to the next initialization phase or transitions to the UEFI firmware boot journal handling block 240.

In some embodiments, the EC log agent 250 may be configured to capture only messages for a particular component such as the EC 190. The EC log agent 250 may also be configured to capture only messages of a specific initialization phase, such as during the security (SEC) initialization phase. In another embodiment, the initialization phase messages may be directly written to an SPI ROM without putting the initialization phase messages in the cache first. In yet another embodiment, the UEFI firmware boot journal recording 200 may be configured to end if any of the initialization phases fail.

Figure 3:
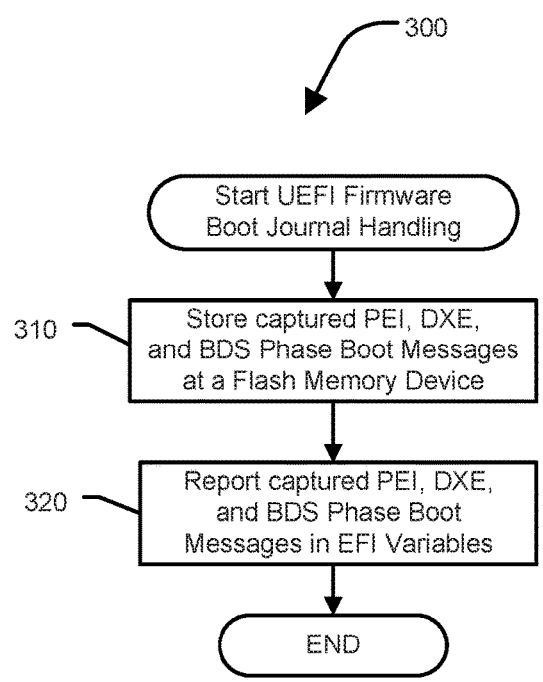
FIG. 3 is a flowchart that shows a method for handling a UEFI firmware boot journal captured by an embedded controller (EC) log agent according to a specific embodiment of the present disclosure.

FIG. 3 shows a method 300 for handling the UEFI firmware boot journal captured by the EC log agent 250 according to a specific embodiment of the present disclosure. Techniques provided herein provide mechanisms to store initialization phase messages or log information gathered during the different initialization phases.

Method 300 begins at block 310 where initialization phase messages including PEI, DXE, and BDS initialization phase messages are stored in a rotating or circular buffer at a flash memory device which is an SPI ROM. The circular buffer is configured to receive and store the initialization phase messages. The EC log agent 250 stores or writes the initialization phase messages in the circular buffer. The EC log agent 250 converts the initialization phase messages into a UEFI variable in memory accessible from a runtime OS. The captured initialization phase messages may be stored in the circular buffer and converted to the UEFI variable prior to transferring control of the information handling system to the runtime OS. In one embodiment, the circular buffer may be in an isolated space in an SPI ROM.

Once the circular buffer is full, a reclaim mechanism is performed to delete the oldest initialization phase messages. The circular buffer may be divided into segments where the latest captured initialization messages are stored. A pointer may be used to point to the latest segment. A pointer may also be used to identify the location of the start of the circular buffer. Another pointer may be used to identify the end of the circular buffer. When the buffer is full, a new bit value may be stored over the oldest bit value at the start of the circular buffer, thus erasing the oldest initialization phase message. Typically, historical initialization phase messages are not accessible after a reboot. However, by capturing and storing the initialization phase messages in an SPI ROM, historical initialization phase message of previous reboots are available to provide information that may be used when debugging.

The runtime OS can access memory to read the stored initialization messages using UEFI services in response to a request. To be able to use the UEFI services the stored initialization phase messages are converted into a UEFI variable with boot services access (BS) and runtime access (RT) attributes. The BS and RT attributes allow the OS access to the initialization phase messages.

Even though a UEFI variable is usually volatile (a value saved in a UEFI variable is lost after a subsequent reboot), because the stored initialization phase messages are stored in the SPI ROM, the messages persist even with subsequent reboots of the information handling system 100. The stored initialization messages also persist even when the UEFI firmware performs read/write operations during a BIOS update. During a subsequent reboot, the latest captured initialization phase messages are added to the stored initialization phase messages. Prior to adding the latest captured initialization phase messages into the buffer, a determination may be made on whether the circular buffer has enough available space for the latest captured initialization phase messages. If there is not enough available space in the circular buffer, initialization phase messages or a portion thereof currently stored in the circular buffer may be deleted. Thus, the circular buffer may contain historical initialization phase messages from several reboots ago. A user may be able to retrieve historical initialization phase messages for debugging or information purposes.

The non-volatile store (NVSTORE) is a non-volatile RAM (NVRAM) that is used to store UEFI variables that persist between boots for example via UEFI variable services, NVRAM attribute accesses, access control item (ACI) staged accesses and the like. The UEFI variable services provides a way to share data between a firmware and operating system. UEFI protocol provides an interface structure containing definitions, and a set of functions, such as the UEFI variable services. Each UEFI protocol includes a global unique identifier (GUID), which is a 128-bit value used to differentiate services and structures in the boot services environment.

As mentioned above, one or more partitions of the SPI ROM may be used to store initialization phase messages during the various initialization phases. The initialization phase messages are POST messages for a particular initialization phase. By segregating, logically or physically, the location of the circular buffer from the location of the NVSTORE, the storage capacity may be maximized for UEFI variables and the initialization phase messages. For example, the SPI ROM may be in a separate flash memory device than the flash memory device where the NVSTORE is located. By also storing the initialization phase messages in the SPI ROM, the messages are preserved when the information in another memory location is erased and/or updated for example during a BIOS update.

Figure 4:
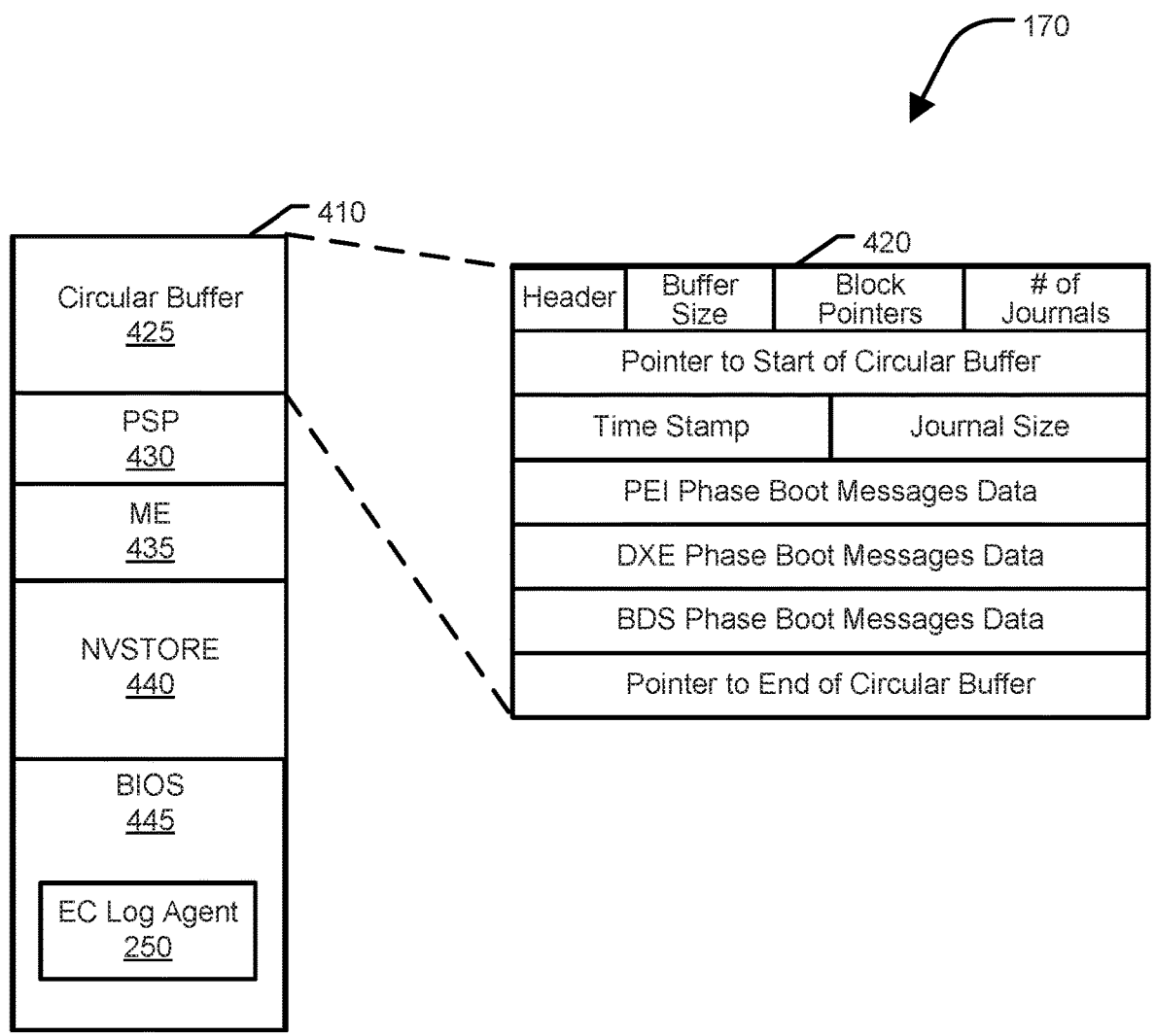
FIG. 4 shows a flash memory device according to a specific embodiment of the present disclosure.

FIG. 4 shows a flash memory device 170 of FIG. 1 according to a specific embodiment of the present disclosure. The flash memory device 170 can include numerous logical or physical partitions 410, however for clarity only a few of the logical partitions are illustrated. In particular, flash memory device 170 includes circular buffer 425, PSP 430, ME 435, NVSTORE 440, and BIOS 445. The BIOS 445 includes EC log agent 250. The EC log agent 250 may be implemented as a program of instructions that may be read or executed with the execution of the BIOS 445. Although the EC log agent 250 is shown to be an integral component of the BIOS 445, in some embodiments EC log agent 250 may be included in a different component such as the PSP 174 or ME 176. In another embodiment, the EC log agent 250 may be implemented in an isolated component distinct from other components of the information handling system 100. The EC log agent 250 may include any system, device, or apparatus configured to detect initialization phase messages, as further described in this disclosure.

The flash memory device 170 also includes a segment or block 420. Block 420 can be accessed by a runtime OS and provides a map of specific code blocks included at flash memory device 170 that can be individually validated. Block 420 includes a header identifying the circular buffer 425, specifying the size of the circular buffer 425, location of block pointers, number of journals or initialization messages enumerated in the buffer, a pointer to the start of the circular buffer, and a pointer to the end of the circular buffer. For each enumerated journal, the block includes a time stamp of the initialization message, size of the journal, sub-blocks containing PEI phase boot messages, DXE phase boot messages, and BDS phase boot messages. In response to a request, the circular buffer can be accessed to retrieve the initialization messages or boot journal stored in the circular buffer. The initialization messages are converted to a UEFI variable and retrieved via the UEFI variable services.

FIG. 5 shows an example 500 of initialization messages 510 as retrieved by a runtime OS of the information handling system 100 according to a specific embodiment of the present disclosure and sent to an output device such as a display device. As shown in FIG. 5, the initialization messages 510 were retrieved via the UEFI variable services in response to a query. The query may be performed by a user or triggered by a failure during one of the initialization phases. The EC log agent may be configured to determine whether a particular failure may trigger the runtime operating system to perform a query for the initialization phase messages.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a PC, a tablet PC, a set-top box, a personal digital assistant, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at the information handling system 100, and/or within the CPU 102 during execution by the information handling system 100. The system memory 104 and the CPU 102 also may include computer-readable media. A network interface device (not shown at FIG. 1) can provide connectivity to a network, such as a wide area network (WAN), a local area network (LAN), or another network.

In an alternative embodiment, dedicated hardware implementations such as application specific integrated circuits, programmable logic arrays, and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
capturing, by a boot log agent, initialization phase messages;
storing the captured initialization phase messages at a flash memory device, wherein the captured initialization phase messages are written in a circular buffer at the flash memory device;
converting the captured initialization phase messages into a unified extensible firmware interface (UEFI) variable;
in response to receiving a query from an operating system, outputting the UEFI variable to an output device; and
capturing during subsequent reboot second initialization phase messages, wherein the captured second initialization phase messages are added to the captured initialization phase messages stored in the flash memory device.

2. The method of claim 1, further comprising:
determining whether the circular buffer has enough space to store the second initialization phase messages; and
in response to determining that the circular buffer does not have enough space to store the second initialization phase messages, deleting the captured initialization phase messages before writing the second initialization phase messages in the circular buffer.

3. The method of claim 1, wherein the flash memory device is a serial peripheral interface read only memory device.

4. The method of claim 1, wherein the boot log agent is included in a basic input/output system firmware.

5. The method of claim 1, wherein the captured initialization phase messages include messages outputted during a pre-EFI initialization phase, a driver execution environment phase, and a boot device selection phase.

6. The method of claim 1, wherein the UEFI variable includes a boot sequence and a runtime sequence attribute.

7. The method of claim 1, wherein the initialization phase messages are converted in a memory accessible by a runtime operating system.

8. The method of claim 1, wherein the query from the operating system is initiated by a failure during initialization.

9. An information handling system comprising:
a processor;
an embedded device coupled to the processor; and
a flash memory device to store boot instructions, the boot instructions including a boot log agent configured to collect initialization phase messages and to convert the initialization phase messages into a unified extensible firmware interface variable with boot services access attribute and runtime access attribute to allow an operating system to access the initialization phase messages, wherein the collected initialization phase messages includes initialization phase messages of the embedded device, and wherein the flash memory device also includes a circular buffer configured to store the collected initialization phase messages.

10. The information handling system of claim 9, wherein the boot log agent is configured to collect initialization phase messages during a boot sequence.

11. The information handling system of claim 9, wherein the initialization phase messages include initialization phase messages during a pre-extensible firmware interface initialization phase, a driver execution environment phase, and a boot device selection phase.

12. The information handling system of claim 9, wherein the flash memory device is a serial peripheral interface read only memory device.

13. The information handling system of claim 9, wherein the boot log agent is configured to collect initialization phase messages of the embedded device during a boot sequence.

14. An information handling system comprising:
   a flash memory storing boot instructions; and
   a processor to execute the boot instructions, the boot instructions including a boot log agent configured to collect initialization phase messages, to convert the with boot services access attribute and runtime access attribute to allow an operating system to access the initialization phase messages and to capture during subsequent reboot second initialization phase messages, wherein the captured messages stored in the flash memory, and wherein the flash memory also includes a circular buffer configured to store the collected initialization phase messages.

15. The information handling system of claim 14, further comprising an embedded device, wherein the collected initialization phase messages include initialization phase messages of the embedded device.

16. The information handling system of claim 14, wherein the flash memory is a serial peripheral interface read only memory device.

17. The information handling system of claim 14, wherein the circular buffer is configured to store the collected initialization phase messages at a location distinct from a non-volatile random access memory used by a unified extensible firmware interface service to store unified extensible firmware interface variables.

* * * * *

UNITED STATES PATENT AND TRADEMARK OFFICE
CERTIFICATE OF CORRECTION

PATENT NO. : 10,776,131 B2  
APPLICATION NO. : 16/117286  
DATED : September 15, 2020  
INVENTOR(S) : Wei Liu et al.

Page 1 of 1

It is certified that error appears in the above-identified patent and that said Letters Patent is hereby corrected as shown below:

In the Claims

Column 11, Lines 8-9: Please change "to convert the with boot services" to --to convert the initialization phase messages into a unified extensible firmware interface variable with boot services--

Column 11, Line 13: Please change "wherein the captured messages stored" to --wherein the captured second initialization phase messages are added to the collected initialization phase messages stored--

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*